(12) United States Patent
Hariharan et al.

(10) Patent No.: US 7,720,948 B2
(45) Date of Patent: May 18, 2010

(54) METHOD AND SYSTEM OF GENERICALLY SPECIFYING PACKET CLASSIFICATION BEHAVIOR

(75) Inventors: Seeta Hariharan, Raleigh, NC (US);
Brooks Johnston, Cary, NC (US);
Sridhar Rao, Raleigh, NC (US);
Bahram Sanaei, Raleigh, NC (US);
Sreekrishnan Venkateswaran, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 10/706,262

(22) Filed: Nov. 12, 2003

(65) Prior Publication Data

US 2005/0102686 A1    May 12, 2005

(51) Int. Cl.
*G06F 15/173* (2006.01)
(52) U.S. Cl. .................. 709/223; 709/224; 709/228
(58) Field of Classification Search ............. 709/223, 709/224, 228
See application file for complete search history.

(56) References Cited

U.S. PATENT DOCUMENTS

| | | | |
|---|---|---|---|
| 5,097,533 A | 3/1992 | Burger et al. | |
| 5,668,958 A | 9/1997 | Bendert et al. | |
| 5,680,618 A | 10/1997 | Freund | |
| 5,724,556 A * | 3/1998 | Souder et al. ............ | 703/2 |
| 5,826,030 A | 10/1998 | Hebert | |
| 5,878,431 A * | 3/1999 | Potterveld et al. ....... | 707/103 R |
| 6,026,426 A | 2/2000 | Badovinatz et al. | |
| 6,311,238 B1 | 10/2001 | Hebert | |
| 6,711,171 B1 * | 3/2004 | Dobbins et al. ............ | 370/400 |
| 7,000,237 B1 * | 2/2006 | Sinha ......................... | 719/318 |
| 7,185,070 B2 * | 2/2007 | Paul et al. .................. | 709/220 |
| 2002/0087741 A1 * | 7/2002 | Ing et al. ................... | 709/328 |
| 2002/0147797 A1 | 10/2002 | Paul | |
| 2004/0103110 A1 * | 5/2004 | Goode et al. ............... | 707/101 |
| 2006/0173989 A1 * | 8/2006 | Lin ............................. | 709/223 |

FOREIGN PATENT DOCUMENTS

GB    2 355 818 A    5/2001

OTHER PUBLICATIONS

IBM Technical Disclosure Bulletin, "Generic Code Page Conversion Application Program Interface", vol. 34, No. 12, May 1992.

* cited by examiner

*Primary Examiner*—John Follansbee
*Assistant Examiner*—Nghi V Tran
(74) *Attorney, Agent, or Firm*—Yee & Associates, P.C.; Mark E. McBurney

(57) ABSTRACT

A method and system for controlling packet classification behavior of a plurality of heterogeneous network processors in a network is disclosed. The network also includes at least one host processor that utilizes at least one packet classification application. The method and system include providing a plurality of generic application program interfaces (APIs). The generic APIs communicate with the packet classification application(s) and the heterogeneous network processors. The generic APIs communicate with the packet classification application(s) in the host processor(s) in a network processor independent manner, but manage the packet classification behavior of the heterogeneous network processors in a network processor specific manner. Thus, the generic APIs allow the packet classification application(s) to be network processor independent and to manage the packet classification behavior of the heterogeneous network processors in the network processor specific manner.

21 Claims, 5 Drawing Sheets

US 7,720,948 B2

METHOD AND SYSTEM OF GENERICALLY SPECIFYING PACKET CLASSIFICATION BEHAVIOR

FIELD OF THE INVENTION

The present invention relates to computer systems, and more particularly to a method and system for providing a mechanism for allowing a host to manage packet classification behavior of a network processor in a scalable, flexible manner.

BACKGROUND OF THE INVENTION

Driven by increasing usage of a variety of network applications, such as those involving the Internet, computer networks are of increasing interest. In order to couple portions of a network together or to couple networks together, network processors residing in switches, routers, and/or other components are typically used. The switches, routers, and/or other components allow packets to be transmitted through the network. However, different packets may be desired to be handled differently. For example, packets from certain sources may be refused entry to portions of the network. Other packets may be granted higher priority in transmission through the network.

In order to determine how packets are to be handled, the packets are classified. Packet classification typically includes using various rules and determining which of the rules apply to particular packets. Thus, packet classification includes defining various rules. For example, one rule might specify that packets having certain source addresses will be discarded if their destination address is for a portion of the network for which access is to be denied. In order to determine whether a particular rule applies to a particular packet in the network processor, the packet is compared with the criteria for the rules. Packet classification typically includes determining whether each incoming packet to the network processor matches the criteria for particular rules as well as defining the rules. In order to ensure that packet classification is performed as desired, a network administrator typically desires to manage the packet classification behavior of the network processors.

FIG. 1 depicts a block diagram of a conventional system 10 for packet classification in network processors. The system 10 includes a conventional host processor 20 used by a network administrator and conventional network processors 30, 40, and 50. The conventional host processor 20 typically includes a conventional packet classification application 22 that is developed at least in part by the owner of the conventional system 10. The network administrator uses the conventional packet classification application 22 to manage the packet classification behavior of the conventional network processors 30, 40, and 50 in the conventional system 10.

The conventional network processors 30, 40, and 50 are typically purchased by the owner of the conventional system 10. The conventional network processors 30, 40, and 50 each includes conventional software and/or firmware 32, 42, and 52, respectively, that may be different. For example, the conventional network processors 30, 40, and 50 may include different versions of a particular model of network processor from a particular vendor and/or other model(s) of network processor that may be from other vendors. Thus, the conventional network processors 30 and 40 are depicted as having software and/or firmware 32 and 42 that are different versions of a Model X network processor, while the software and/or firmware 52 of the conventional network processor 50 is a Model Y network processor. For example, typically the conventional software and/or firmware 32, 42, and 52 used in packet classification is burned into conventional network processor 30, 40, and 50 so that the network processor handles certain types of packets in a particular way, using particular rules. Because the conventional network processors 30, 40, and 50 are thus very distinct, each conventional network processor 30, 40, and 50 utilizes conventional application program interfaces (APIs) 12, 14, and 16, respectively, that are specific to the particular software and/or firmware 32, 42, and 52, respectively.

The conventional packet classification application 22 is used to manage the packet classification behavior of the conventional network processors 30, 40, and 50, respectively. The conventional packet classification application 22 thus includes a corresponding set of conventional behaviors 24, 26, and 28 for each set of the conventional APIs 12, 14, and 16, respectively. The conventional APIs 12, 14, and 16 are designed to communicate with the conventional behaviors 32, 42, and 52, respectively. The conventional APIs 12, 14, and 16 are also used to control the corresponding software and/or firmware 32, 42, and 52, respectively. Thus, using the conventional behaviors 24, 26, and 28 corresponding to the conventional APIs 12, 14, and 16, respectively, the conventional packet classification application 22 can control the packet classification behavior of each of the conventional network processors 30, 40, and 50, respectively.

Although the conventional system 10 functions, one of ordinary skill in the art will readily recognize that the conventional system is difficult to scale. The conventional network processors 30, 40, and 50 are typically heterogeneous in nature. Because the conventional network processors 30, 40, and 50 are heterogeneous, the conventional network processors may include different versions of a particular model of network processor and/or different models of network processor. In addition, the method of specifying the packet classification behavior of each conventional network processor 30, 40, and 50 may differ widely. Thus, the software and/or firmware 32, 42, and 52 of different network processors typically differ. The APIs 12, 14, and 16 thus also differ. Consequently, the corresponding behaviors 24, 26, and 28 of the conventional packet classification application 22 are distinct. One of ordinary skill in the art will also readily recognize that the conventional system 10 may actually include a large number of network processors. Consequently, the number of conventional APIs 12, 14, and 16 with which the conventional packet classification application 22 must be compatible may be large. As a result, the number of distinct conventional behaviors used by the conventional host processor 20 and developed by the owner of the conventional system 10, such as the conventional behaviors 24, 26, and 28, may be large. As a result, the conventional packet classification application 22 may be complex and include an amalgamation of a variety of behaviors, one for each model and/or version of conventional network processor. It may thus be difficult to incorporate new network processors, which may have software and/or firmware and thus APIs not previously supported. The conventional system 10 is, therefore, difficult to scale. Because of difficulties in incorporating new software and/or firmware and their corresponding APIs, evolving the conventional packet classification application 22 and, therefore, the conventional system 10 to utilize improved network processors may be problematic. Furthermore, because supporting a variety of conventional behaviors 24, 26, and 28 makes the conventional packet classification application 22 more complex, the conventional system 10 may be subject to higher maintenance costs.

Accordingly, what is needed is a system and method for allowing a host to control packet classification behavior of a network processor in a scalable, flexible manner. The present invention addresses such a need.

SUMMARY OF THE INVENTION

The present invention provides a method and system for controlling packet classification behavior of a plurality of heterogeneous network processors in a network. The network also includes at least one host processor that utilizes at least one packet classification application. The method and system comprise providing a plurality of generic application program interfaces (APIs). The generic APIs communicate with the packet classification application(s) and the heterogeneous network processors. The generic APIs communicate with the packet classification application(s) in a network processor independent manner, but manage the packet classification behavior of the heterogeneous network processors in a network processor specific manner. Thus, the generic APIs allow the packet classification application(s) to be network processor independent and to manage the packet classification behavior of the heterogeneous network processors in the network processor specific manner.

According to the system and method disclosed herein, the present invention provides a generic mechanism for managing the packet classification behavior. As a result, a customer need not maintain a packet classification application having different sets of API for different types (e.g. models and/or versions) of network processors.

DETAILED DESCRIPTION OF THE INVENTION

The present invention relates to an improvement in computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for controlling packet classification behavior of a plurality of heterogeneous network processors in a network. The network also includes at least one host processor that utilizes at least one packet classification application. The method and system comprise providing a plurality of generic application program interfaces (APIs). The generic APIs communicate with the packet classification application(s) and the heterogeneous network processors. The generic APIs communicate with the packet classification application(s) in a network processor independent manner, but manage the packet classification behavior of the heterogeneous network processors in a network processor specific manner. Thus, the generic APIs allow the packet classification application(s) to be network processor independent and to manage the packet classification behavior of the heterogeneous network processors in the network processor specific manner.

The present invention will be described in terms of a particular computer system, a particular network processor, and certain APIs. However, one of ordinary skill in the art will readily recognize that this method and system will operate effectively for other computer system and network processors, as well as additional and/or other APIs. The present invention is also described in the context of a network including specific components and a particular number of components. However, one of ordinary skill in the art will readily recognize that the present invention is consistent with other networks containing other and/or additional components as well as another number of components. The present invention is also described in the context of particular rules, fields and other implementation specifics. One of ordinary skill in the art will readily recognize that the present invention is consistent with other and/or additional rules, fields and other implementation specifics.

Figure 2:
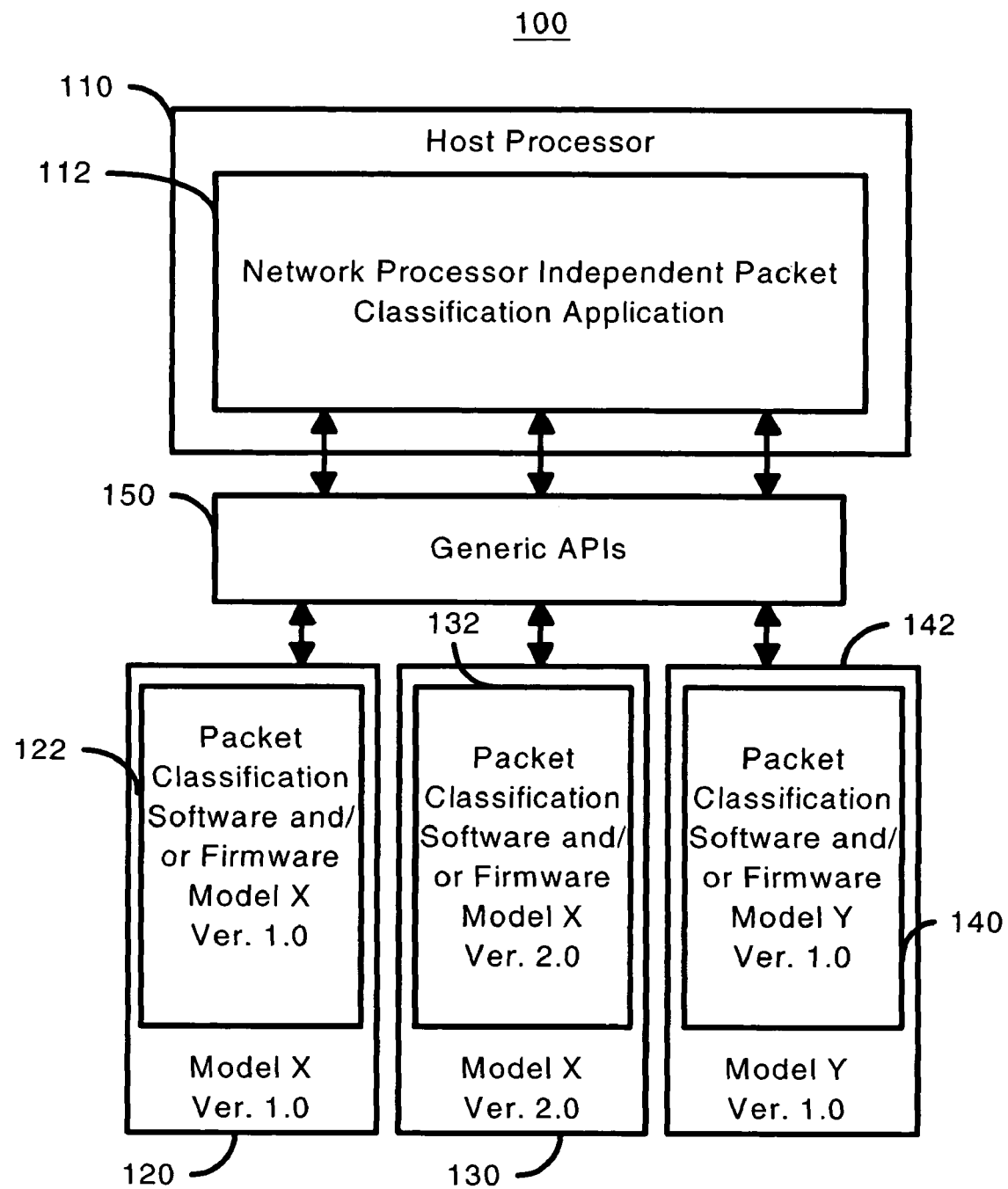
FIG. 2 is a diagram of one embodiment of a system in accordance with the present invention for generically managing packet classification behavior of network processors.

To more particularly illustrate the method and system in accordance with the present invention, refer now to FIG. 2, depicting one embodiment of a system 100 in accordance with the present invention for managing the packet classification behavior of network processors. The system 100 is depicted as including a host processor 110 and network processors 120, 130, and 140. The host processor 110 includes a packet classification application 112. The network processors 120, 130, and 140 include packet classification software and/or firmware 122, 132, and 142, respectively. However, one of ordinary skill in the art will readily recognize that the generic APIs 150 are of particular utility. In addition, the generic APIs 150 are depicted as a separate entity. However, one of ordinary skill in the art will readily recognize that the host processor 110 and network processors 120, 130, and 140 utilize the generic APIs 150 for communication and control.

Figure 1:
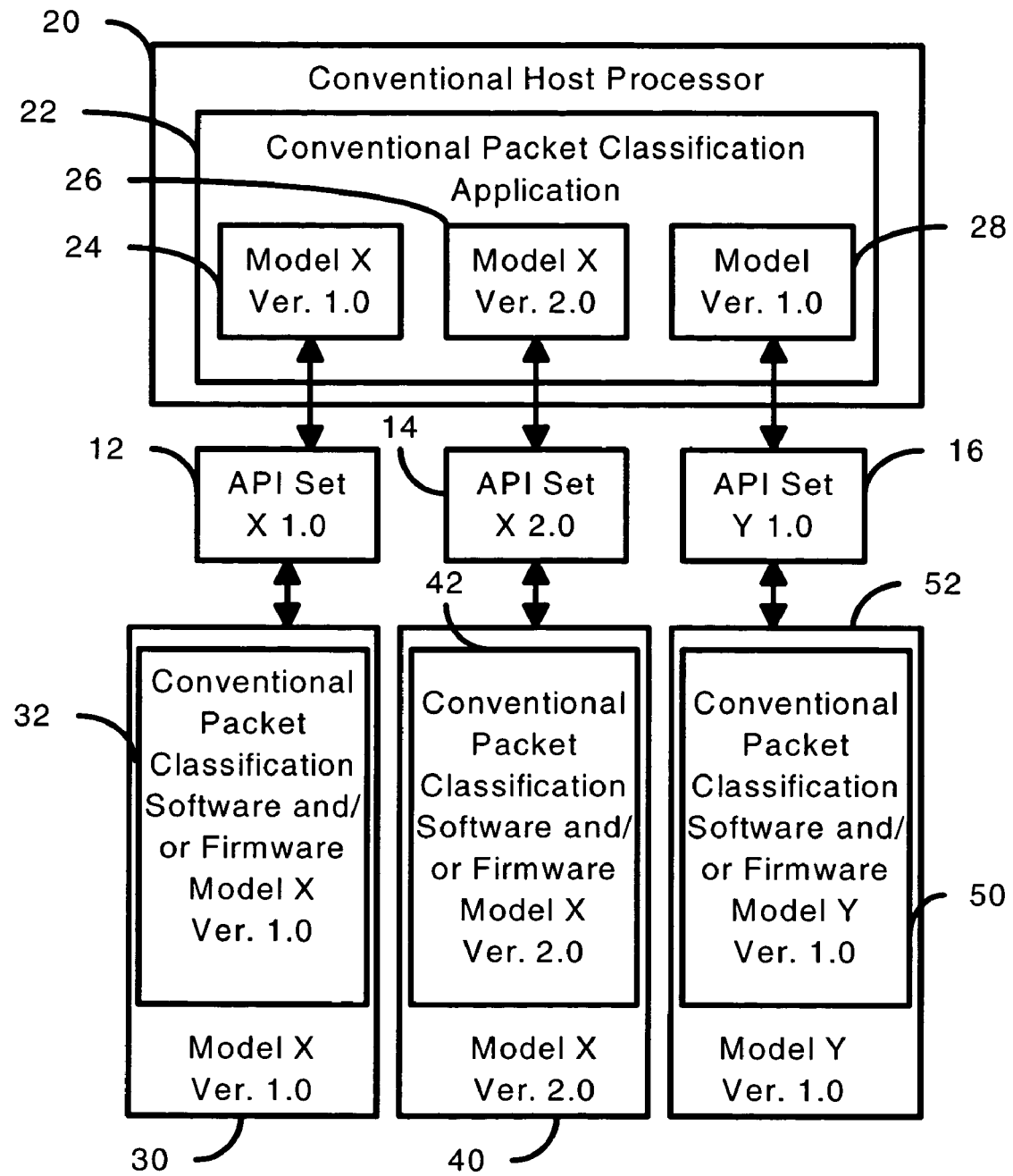
FIG. 1 is a diagram of a conventional system for managing packet classification behavior of network processors.

The network processors 120, 130, and 140 are capable of being heterogeneous. Thus, the network processors 120, 130, and 140 may have hardware, software, and/or firmware for packet classification that differ significantly. For example, as depicted in FIG. 2, the software and/or firmware 122 for the network processor 120 is Model X, Version 1.0. In contrast, the network processor 130 includes software and/or firmware 132 that is Model X, Version 2.0. The network processor 140 is a completely different model, having software and/or firmware 142 that is Model Y, Version 1.0. Other network processors (not shown) having different models and/or versions may also be included. Because they are heterogeneous, in the absence of the present invention, the network processors 120, 130, and 140 would each require a separate network processor specific set of APIs in order to be controlled by a conventional packet classification application, such as the conventional packet classification application 12 depicted in FIG. 1.

Referring back to FIG. 2, the generic APIs 150 include APIs are used by the packet classification application 112 and the network processors 120, 130, and 140. In particular, the generic APIs communicate with and are used by the packet classification application 112 in a network processor independent manner. In other words, the packet classification application 112 is network processor independent. In the context of the present application, a network processor independent manner means that the packet classification application 112 need not contain knowledge of the specific hardware, software, and/or firmware 122, 132, and 142 of any of the network processors 120, 130, and 140, respectively, being controlled. At the same time, the packet classification application 112 can manage the packet classification behavior of the network processors 120, 130, and 140 by managing the software and/or firmware 122, 132, and 142, respectively. Because the packet classification application 112 is network processor independent, the packet classification application 112 can configure and/or update the packet classification behavior of the network processors 120, 130, and 140 without requiring specific knowledge of the hardware or software and/or firmware 122, 132, and 142, respectively of the individual network processors 120, 130, and 140, respectively.

The generic APIs 150 also communicate with and control the network processors 120, 130, and 140 in a network processor specific manner. In the context of the present application, network processor specific includes a knowledge of the specifics of a particular network processor, such as the hardware, software and/or firmware 122, 132, and 142, and possibly other components used by the particular network processor 120, 130, and 140, respectively. Thus, the generic APIs 150 allow the packet classification application 112 to be network processor independent while allowing each of the network processors 120, 130, and 140 to be controlled in a network processor specific manner. Furthermore, the generic APIs 150 preferably provide a null behavior for operations not supported by a particular network processor 120, 130, or 140.

Using the system 100, and more particularly the generic APIs 150, the packet classification application 112 can be network processor independent. Because of the use of the generic APIs, the packet classification application 112 can still control the potentially heterogeneous network processors 120, 130, and 140 in a network processor specific manner. As a result, the packet classification application 112, need not include a separate set of APIs for each type of network processor 120, 130, and 140 used. The packet classification application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler packet classification application 112.

Figure 3:
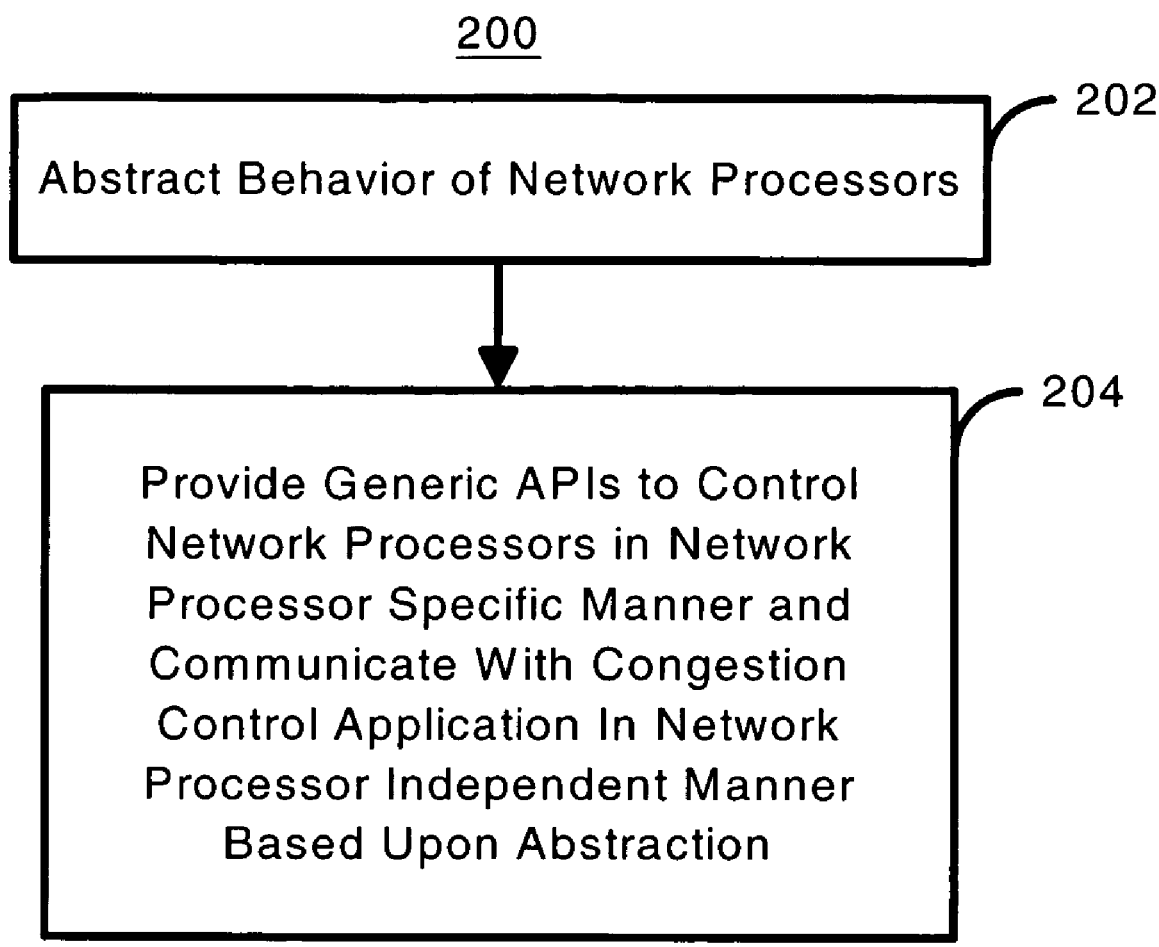
FIG. 3 is a high-level flow chart depicting one embodiment of a method in accordance with the present invention for providing a mechanism in accordance with the present invention for managing packet classification behavior of network processors.

FIG. 3 is a high-level flow chart depicting one embodiment of a method 200 in accordance with the present invention for providing a mechanism in accordance with the present invention for managing packet classification behavior of network processors. The method 200 is described in the context of the system 100 depicted in FIG. 2. In particular, the method 200 may be used to determine the generic APIs 150. Referring to FIGS. 2 and 3, the packet classification application 112 can then be developed in a network processor independent manner using the generic APIs 150. Similarly, the network processors 120, 130, and 140, which may be heterogeneous, have components such as software and/or firmware 122, 132, and 142, respectively, that can be managed by the generic APIs 150 in a network specific manner. The network processors 120, 130, and 140 may thus be controlled in a network processor specific manner using the generic APIs 150.

The packet classification behavior of network processors, such as the network processors 120, 130, and 140, is abstracted, via step 202. Each network processor 120, 130, and 140 performs packet classification in a specific manner. Step 202 abstracts the packet classification behavior of network processors to a more general level. For example, step 202 includes determining how rules are to be defined, how rules interact with each other and how rules interact with packets.

Figure 4:
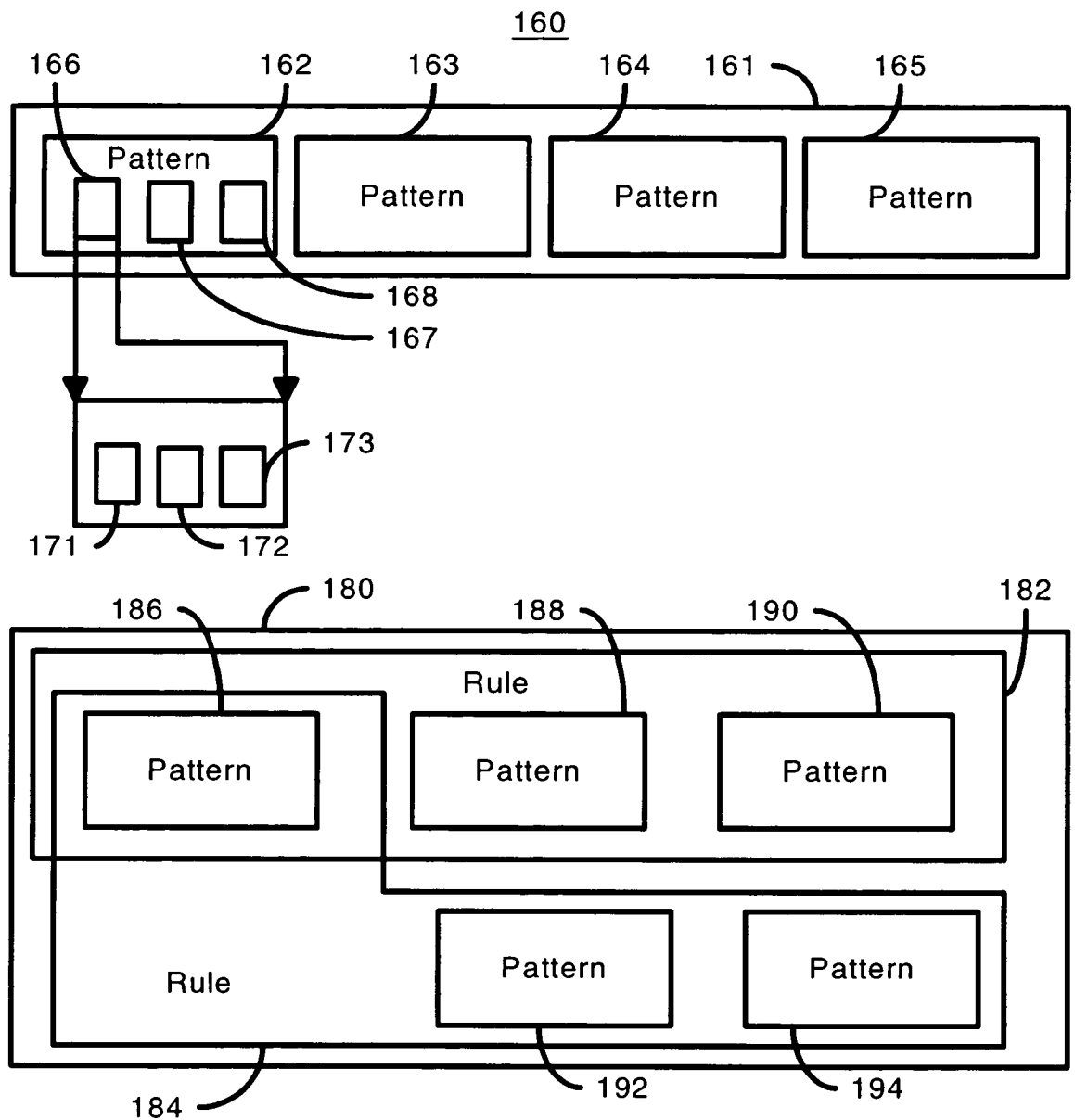
FIG. 4 is a block diagram depicting one embodiment of an abstraction of packet classification behavior in network processors.

For example, FIG. 4 is a diagram depicting one embodiment of an abstraction 160 of packet classification behavior in network processors. The abstraction includes an abstraction of an incoming packet 161 and an abstraction of the rules 180. The packet 161 is abstracted as including fields 166, 167, and 168. Each field includes one or more bits, such as the bits 171, 172, and 173. Each field includes a varying number of bits starting at a particular offset from the start of the packet. In addition, a mask (not explicitly shown) may indicate the bits of interest for classification. The value (not explicitly shown) is the value that a field has to match a particular rule. One or more fields are combined to form patterns 162, 163, 164, and 165. If all of the fields in a pattern match, then the pattern matches. A rule includes one or more patterns such that if a packet includes one of the patterns of the rule, then the rule is a hit. Abstracted rules 182 and 184 are shown. The rule 182 includes patterns 186, 188, and 190. The rule 184 includes patterns 186, 192, and 194. Thus, the rules 182 and 184 have one overlapping pattern, 186. If one of the patterns 162, 163, 164, or 165 of the packet 161 matches the pattern 186, then both rules 182 and 184 are considered to be hit. Under such conditions, the rule 182 or 184 having the hither priority prevails. In addition, if one of the patterns 162, 163, 164, or 165 for the packet 161 matches the patterns 188 or 190, then the rule 182 is considered to be hit. Similarly, if one of the patterns 162, 163, 164, or 165 for the packet 161 matches a pattern 192 or 194, then the rule 184 is considered to be hit. Thus, the rule 182 or 184 controls the classification behavior of the network processor.

In addition to the patterns used in matching rules, a rule is also abstracted by specifying a rule number, a priority, a rule type, a port type, a receive queue number and rule specifications. The rule number is preferably a unique value between certain limits, for example between zero and fifteen. The priority of the rule is also within a particular range. In a preferred embodiment, a higher priority has a lower numerical value.

The rule type refers to the format for collecting rule specifications. In a preferred embodiment, the rule type is either Canned and Custom. A Canned Rule is a rule in which the packet classification rules, the combinations of patterns, that are well known. A Custom Rule is a rule having rules, or combinations of patterns, that are specifically defined for a particular domain, application or vendor. In a preferred embodiment, the combinations of patterns are known and can be specified using a selection code. The selection code is a running number and represents a particular packet classification.

Examples of Canned Rules include but are not limited to: IPV4 over Ethernet with/without 802.1q VLAN support, IPV6 over Ethernet with/without 802.1q VLAN support, and ARP/RARP over Ethernet with/without 802.1q VLAN support. Once a selection code is chosen, the packet classification software and/or firmware 122, 132, and/or 142 in the network processor 120, 130, or 140, respectively, defines the rule and programs this rule into its hardware classification engine.

For Custom Rules, the rule specification includes a field specification and a pattern specification. In a preferred embodiment, up to sixteen fields may be specified. As discussed above, each field is defined by an offset, length, mask and value. The offset is preferably defined in half word (two bytes) and the length is defined in bytes. The field is entered in sequence starting from the first field to the number of fields. For example, if the number of fields is three, then the first field is Field 1, the second is Field 2 and the last field is Field 3.

The Port Type and Receive Queue Number parameters indicate where the rule should be applied. In a network processor, packets arrive through input ports (of a particular class such as Ethernet, PPP or ATM Ports) and are enqueued for classification and processing in receive queues (not shown). Each receive queue is associated with one or more input ports. A receive queue can be associated with input ports of different classes or a single class. The Port Type parameter for a rule indicates the class of input ports for packets to which the rule is to be applied. The values of the Port Type may include, for example, Ethernet, PPP (Point-to-Point Protocol), ATM (Asynchronous Transfer Mode) or Disabled. For example, specifying Ethernet as the Port Type implies that the rule is to be applied to all packets enqueued in receive queues that are associated with the Ethernet ports within the network processor. The Receive Queue Number parameter only applies if the Port Type is set to 'Disabled'. Specifying for example, "1", implies that the packet classification rule is to be applied to all arriving packets enqueued in Receive Queue Number "1" only.

The pattern specification preferably supports up to sixteen patterns. For each pattern, the user defines the fields that should be ANDed together to form the pattern. The maximum number of fields per pattern is preferably sixteen. The field numbering Is as described above. The inclusion of each field is controlled by two bits that specify the following: true value, complement value or do not care. If the bits are set to true value the result of the field match is included. If the bits are set to complement, then the complement of the field match result is included. If the bits are set to do not care, then the results of the field match result are not included. For example, referring to FIG. 4, if the pattern 186 was specified as including field 171 with true value, field 172 with complement value, and field 173 with do not care, then the pattern 186 is said to match if the packet 161 contains a bit stream that matches the specifications for the field 171 AND does not match the specifications for the field 172. The field 173 is ignored during pattern matching in this example.

The rule specification also selects which of the patterns should be ORed together. The inclusion of each pattern is controlled by two bits that specify the following: true value, complement value or do not care, which operate as discussed above. For example, if the pattern 186 is specified as true value, the pattern 188 is specified as complement value and the pattern 190 is specified as do not care, then the rule 182 is said to be hit if the packet 161 contains a bit stream that matches the pattern 186OR does not match the pattern 188.

The pattern 190 is not considered during pattern matching in this case. A rule perferably contains one to sixteen patterns. Thus, the field 166, 167, or 168 can be abstracted using the offset, length, mask, and value. The pattern 162, 163, 164, 165, 186, 188, 190, 192, or 194 can be abstracted using the fields included in each pattern and how the results of a field match are ANDed together. The rules 182 and 184 are defined by the patterns 186, 188, and 190 and 186, 192 and 194, respectively, and how the patterns are ORed together. Thus, the packet classification behavior, in particular the rules and relevant aspects of the packets, can be abstracted.

The generic APIs 150 are defined using the abstraction provided, via step 204. Thus, step 204 provides the generic APIs 150 that can preferably manage packet classification behavior for the network processors 120, 130, and 140. Step 204 also provides the generic APIs 150 such that the APIs can be used with a network processor independent packet classification application 112. Thus, using the method 200, the generic APIs 150 can be provided. The network processor independent packet classification application 112, as well as the network processors 120, 130, and 140 can be developed to utilize the generic APIs 150.

In a preferred embodiment, the generic APIs 150 include at least APIs for defining the rule, deleting a rule, purging all rules, viewing rules, listing rules and swapping rule priorities in the network processors 110, 120, and 130 in a network processor specific manner. The generic APIs 150 preferably include APIs for defining rules, deleting rules, purging rules, viewing rules, listing rules, and swapping the priorities of rules for the network processors 110, 120, and 130. In addition to controlling the network processors 110, 120, and 130 in a network processor specific manner, the APIs 150 preferably also return a null behavior for a particular function that is not implemented by a particular network processor.

The APIs of the generic APIs 150 that are used to configure and update the packet classification behavior preferably determine the location(s) in each of the network processors 120, 130, and 140 at which packets are to be classified. For example, as discussed below, the define API preferably allows a user such as a network administrator to indicate the priority, rule number, rule type, the corresponding fields and patterns, the values for the fields. Similarly, the purge API allows the user to delete all rules for a network processor. The view, delete, and list APIs allow a user to view, delete, and list certain rules. In addition, the swap priority API allows the priorities of two rules to be switched.

In a preferred embodiment, the generic APIs 150 include six APIs: define, delete, purge, view, list, and swap priority. In order to use the define, delete, purge, view, list, and swap priority APIs, parameters and fields are specified and utilized. Table 1 describes a preferred embodiment of the fields used. Note, however, that in an alternate embodiment, additional and/or different fields having additional and/or different values.

TABLE 1

| Field Name | Field Description |
|---|---|
| Configured Data Size | Indicated the size of the data in each rule. |
| Error Area Size | Indicates the size (in words) of the parameter area associated with error operation. |
| Error Code | Indicates the Error code that is sent with error operation. |
| Field Length | Indicates the length of field in bytes |
| Field Mask | Indicates the mask value that is masked with the length bytes at the specified offset half word from some reference point in the packet. |

TABLE 1-continued

| Field Name | Field Description |
| --- | --- |
| Field Offset | Indicates the field offset in half word. This offset picks a half word aligned from the 72 bytes of the packet data and 8 bytes of the port information for this masked compare |
| Field Size | Indicates the number of words in each field. |
| Field Value | Indicates the value which is compared with the length bytes at the specified offset half word from some reference point in the packet are masked out. |
| Invoke ID | A field used by the Service Requestor to correlate invocations with responses. |
| Number of Fields | Indicates the total number of fields in this service request. Each field is given by the tuple (offset, length, mask. and value). Maximum is 16. |
| Number of Patterns | Indicates the total number of patterns in this service request. A pattern corresponds to a set of fields which are logically ANDed together. Maximum is 16. |
| Number of Rules | Indicates the number of the rules. Maximum is 16. |
| Operation Class | Indicates the conditions under which a response is to be sent to the Service Requestor. |
| Operation Code | Indicates the operation whose invocation is being requested. |
| Operation Version | Indicates the version level of the operation. |
| Output Mode | Select amount of information in response. If this option is enabled, all data are returned. If this option is not set, only selected data are returned. |
| Parameter Area Size | Indicates the size (in words) of the parameter area associated with this operation. |
| Pattern Number Field Number Select | Indicates which field number belong to this pattern number for AND operation. |
| Port Type | Indicates the type of port associated with the rule. Can be Disabled, Ethernet, PPP, ATM |
| Rule Number | Indicates the rule number. It is a unique value in range of 0 to 15. |
| Rule Number Pattern Number Select | Indicates which pattern number belong to this rule number for OR operation. |
| Rule Priority | Indicates the rule priority. It is a unique value in range of 0 to 15. Lowest value having higher priority then highest value. |
| Rule Type | The rules can be managed based on two rule types: Canned or Custom. |
| Rx Queue Number | Indicates the receive queue associated with the rule. |
| Search Filter | Filter the response by Search Filter types. |
| Selection Code | Identifies predefined rules that program in the classifier. |
| Service Element Type | Indicates the nature of service. The possible values are: API-INVOKE, API-RESULT or API-ERROR. |

The define API enables a packet classification application 112 executing on the processor 110, to configure the packet classification behavior of a network processor 120, 130, and 140 in a hardware-independent manner. Properties of the rule, such as number, priority, fields, and patterns to be specified. The parameters used by a preferred embodiment of the define API are described below in Table 2.

TABLE 2

| Parameter Name | Value | Remarks |
| --- | --- | --- |
| Rule Number | 0 ... 15 | Values 16 through 255 are reserved. |
| Rule Priority | 0 ... 15 | A lower value implies a higher priority. |
| Rule Type | Canned Custom | |
| Port Type | Ethernet PPP ATM Disabled | Values in the range 4 ... 255 are reserved. |
| Receive Queue Number | 0 ... 7 | Values in the range 8 ... 15 are reserved. |
| Selection Code | 0 ... 37 | Applicable only when the Rule Type field assumes the value Canned. Values in the range 38 ... 255 are reserved. |

TABLE 2-continued

| Parameter Name | Value | Remarks |
|---|---|---|
| Number Of Fields | 1 ... 16 | Applicable only when the Rule Type field assumes the value Custom. |
| Number Of Patterns | 1 ... 16 | Applicable only when the Rule Type field assumes the value Custom. |
| List Of Field Specifications | List of 1 ... 16 Field Specifications where each Field Specifications include the following sub-fields: Field Offset within packet (in bytes) Field Length (in bytes) Field Mask to filter bits of interest (same size as Field length) Reference Value to compare against the value of the field (same size as field length) | There must be as many instances of Field Specifications as indicated by Number Of Fields. |
| List Of Pattern Specifications | List of 1 ... 16 Pattern Specifications where each Pattern Specification consists of 16 Field Select fields of size 2bits. The Field Select field indicates how a field should be considered while looking for a pattern match. The values it can assume are: 0b01 indicates True Value of a field match result 0b10 indicates Complement Value of a field match result 0b11 indicates Do Not Consider this field in the pattern | There must be as many instances of Pattern Specifications as indicated by Number Of Patterns. |

The Selection Codes defined in this invention are given in the Table 3 below:

TABLE 3

| Code | Description |
|---|---|
| 0x00 | Reserved |
| 0x01 | IPV4 Over Ethernet DIX Unicast |
| 0x02 | IPV4 Over Ethernet DIX Multicast |
| 0x03 | IPV4 Over 802.3 (LLC) |
| 0x04 | IPV4 Over 802.3 (SNAP) |
| 0x05 | IPV4 Over ATM |
| 0x06 | IPV4 Over Ethernet DIX Unicast - VLAN Support |
| 0x07 | IPV4 Over Ethernet DIX Multicast - VLAN Support |
| 0x08 | IPV4 Over 802.3 (LLC) - VLAN Support |
| 0x09 | IPV4 Over 802.3 (SNAP) - VLAN Support |
| 0x0A | IPV4 Over ATM - VLAN Support |
| 0x0B | ARP/RARP Over Ethernet DIX |
| 0x0C | ARP Over 802.3 (LLC) |
| 0x0D | ARP/RARP Over 802.3 (SNAP) |
| 0x0E | ARP/RARP Over Ethernet DIX - VLAN Support |
| 0x0F | ARP Over 802.3 (LLC) - VLAN Support |
| 0x10 | ARP/RARP Over 802.3 - (SNAP) VLAN Support |
| 0x11 | IPV6 Over Ethernet DIX Unicast |
| 0x12 | IPV6 Over Ethernet DIX Multicast |
| 0x13 | IPV6 Over 802.3 (SNAP) |
| 0x14 | IPV6 Over ATM |
| 0x15 | IPV6 Over Ethernet DIX Unicast - VLAN Support |
| 0x16 | IPV6 Over Ethernet DIX Multicast - VLAN Support |
| 0x17 | IPV6 Over 802.3 (SNAP) - VLAN Support |
| 0x18 | IPV6 Over ATM - VLAN Support |
| 0x19 | PPP Over IP Unicast |
| 0x1A | PPP Over IP Multicast |
| 0x1B | PPP Over MPLS Unicast |
| 0x1C | PPP Over ISIS |
| 0x1D | PPP Over Cisco HDLC IP |
| 0x1E | PPP Over Cisco HDLC MPLS UC |
| 0x1F | PPP Over IPX |
| 0x20 | IPX Over Ethernet DIX |

TABLE 3-continued

| Code | Description |
|---|---|
| 0x21 | IPX Over 802.3 (LLC) |
| 0x22 | IPX Over 802.3 (SNAP) |
| 0x23 | IPX Over Ethernet DIX - VLAN Support |
| 0x24 | IPX Over 802.3 (LLC) - VLAN Support |
| 0x25 | IPX Over 802.3 (SNAP) - VLAN Support |

The purge API the packet classification application 112 to delete all the rules defined in a network processor 120, 130, or 140. This API preferably does not have any associated parameters. Similarly, a delete API allows the packet classification application 112 to delete a selected rule.

The view API allows the packet classification application 112 to view the properties of a particular rule. The only parameter associated with this operation is the Rule Number. The operation returns the information about the rule. The content of the information is similar to the parameters specified in the Define_Rule operation.

The list API allows the packet classification application 112 to view the packet classification rules programmed into a network processor 120, 130, or 140 based on some selection filters. The output of operations of the list API depends on whether a Standard Mode or a verbose mode is specified. In the standard mode, only the rule number, priority, port type and receive queue number are returned for every rule that matches the search criteria. In verbose mode, the full information corresponding to the information specified using the define API is returned for every rule that matches the search criteria. The search criteria that the operation supports are the following searching all rules, based on rule type (such as canned or custom rules), by port type (such as Ethernet, PPP, or ATM Ports), or by receive queue number (if known). Thus, the rules can be listed.

The swap priority API is used to enable the packet classification application 112 to swap the priority of two rules. The parameters accepted by this operation are the associated Rule Numbers (i.e. the Rule Number of the two rules whose priority is required to be swapped).

Thus, in a preferred embodiment, the generic APIs 150 include define, purge, delete, view, list, and swap priority APIs. The six generic APIs 150 preferably be used allow the packet classification application 112 to be network processor independent and still control the packet classification behavior of the potentially heterogeneous network processors 120, 130, and 140 in a network processor specific manner. The packet classification application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler packet classification application 112.

Figure 5:
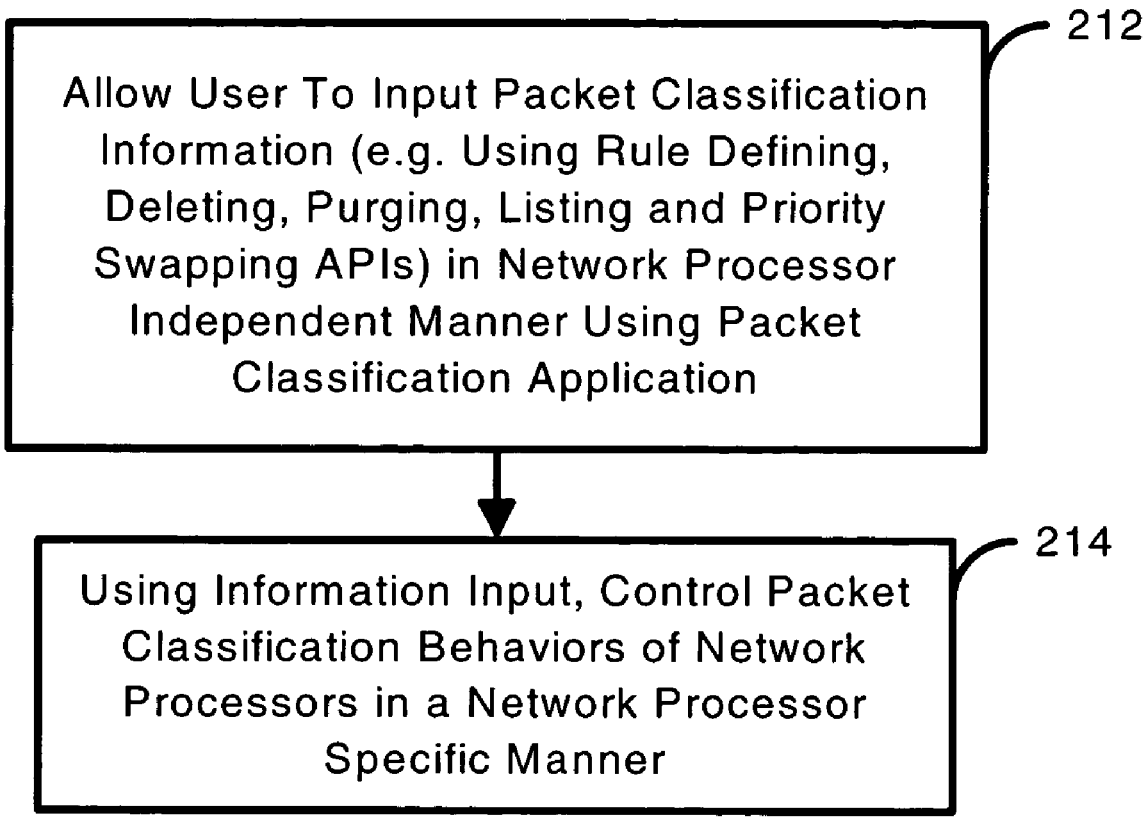
FIG. 5 is high-level flow chart of one embodiment of a method in accordance with the present invention for using a mechanism in accordance with the present invention for managing packet classification behavior of network processors.

FIG. 5 is high-level flow chart of one embodiment of a method 210 in accordance with the present invention for using a mechanism in accordance with the present invention for managing packet classification behavior of network processors. For clarity, the method 210 is described in conjunction with the system 100 depicted in FIG. 2. Referring to FIGS. 2 and 5, the method 210 presumes that the network processors 120, 130, and 140, as well as the packet classification application 112 have been configured for use with the generic APIs 150. For example, the packet classification application 112 is network processor independent and has a generic interface appropriate for use with the generic APIs 112.

A user, such as a network administrator, is allowed to input information to manage the packet classification behavior of the network processors 120, 130, and 140 using the generic APIs 150 in a network independent manner, via step 212. In step 212, therefore, a user might provide the type and priority of the rule desired to be controlled, as well as other information used by the API(s) of the generic APIs being used. The generic APIs 150 are then used to control the possibly heterogeneous network processors 120, 130, and 140 in a network processor specific manner, via step 214.

Using the system 100, the methods 200 and 210, and more particularly the generic APIs 150, the packet classification application 112 can be network processor independent. Because of the use of the generic APIs, the packet classification application 112 can still control the potentially heterogeneous network processors 120, 130, and 140 in a network processor specific manner. As a result, the packet classification application 112 need not include a separate set of APIs for each type of network processor 120, 130, and 140 used. The packet classification application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler packet classification application 112.

A method and system has been disclosed for controlling the packet classification behavior of heterogeneous network processors using a network processor independent control application. Software written according to the present invention is to be stored in some form of computer-readable medium, such as memory, CD-ROM or transmitted over a network, and executed by a processor. Consequently, a computer program product embodied on a computer-readable medium is intended to include computer readable data which, for example, may be transmitted over a network. Similarly, a computer data signal embodied in a carrier wave for enabling a computer to perform a process via a computer program product or computer-readable instructions embodied on a computer-readable medium is envisioned. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for controlling packet classification behavior of a plurality of heterogeneous network processors in a network including at least one packet classification application being network processor independent and utilized in at least one host processor, the system comprising:
    a memory;
    a plurality of definable rules for determining packet classification behavior in a predetermined priority sequence,
    a plurality of generic application program interfaces (APIs) for:
    (i) communicating with each of (a) at least one packet classification application in a network processor independent manner and (b) the plurality of heterogeneous network processors in a network processor specific manner, and
    (ii) managing the packet classification behavior of the plurality of heterogeneous network processors in the network processor specific manner by managing software or firmware associated with the plurality of heterogeneous network processor,
    wherein the plurality of generic APIs are devoid of a separate set of APIs which are specific to each type of one or more of the plurality of heterogeneous network processor, provide a null behavior as a packet classification behavior for unsupported operations, includes a define API for allowing a rule of the plurality of definable rules to be defined, and are defined using abstraction.

2. The system of claim 1 wherein the plurality of generic APIs further return a null behavior for portion of the plurality of heterogeneous network processors in which a particular function of a particular API is not supported by one or more of the plurality of heterogeneous network processors.

3. The system of claim 2 wherein the define API allows a priority, a rule number, a rule type, at least one corresponding field and at least on corresponding patterns to be defined.

4. The system of claim 1 wherein the plurality of generic APIs include a purge API to allow a portion of the plurality of rules for a network processor of the plurality of heterogeneous network processors to be deleted.

5. The system of claim 1 wherein the plurality of generic APIs include a delete API for allowing a rule of the plurality of definable rules to be deleted.

6. The system of claim 1 wherein the plurality of generic APIs include a list API for allowing a portion of the plurality of rules to be listed.

7. The system of claim 1 wherein the plurality of generic APIs include a swap API for allowing a first priority of a first rule to be swapped with a second priority of a second rule.

8. A computer program product embodied on a non-transitory computer-readable storage medium for controlling packet classification behavior of a plurality of heterogeneous network processors in a network including at least one packet classification application being network processor independent and utilized in at least one host processor, the program comprising instruction for:

implementing a plurality of generic application program interface (APIs) devoid of a separate set of APIs which are specific to each type of one or more of the plurality of heterogeneous network processors for communicating with the at least one packet classification application and the plurality of heterogeneous network processors, the plurality of generic APIs for communicating with the at least one packet classification application in the at least one host processor in a network processor independent manner, the plurality of generic APIs managing the packet classification behavior of the plurality of heterogeneous network processors in a network processor specific manner by managing software or firmware associated with the plurality of heterogeneous network processor and the plurality of generic APIs further providing a null behavior as a packet classification behavior for unsupported operations and including a define API for allowing a rule of the plurality of definable rules to be defined by abstraction; wherein the plurality of generic APIs allow the at least one packet classification application to be network processor independent and to manage the packet classification behavior of the plurality of heterogeneous network processors in the network processor specific manner and wherein the program product uses a plurality of definable rules for determining packet classification behavior in a predetermined priority sequence.

9. The computer-readable program product of claim 8 wherein the plurality of generic APIs further returns a null behavior for a portion of the plurality of heterogeneous network processors in which a particular function of a particular API is not supported by one or more of the plurality of heterogeneous network processors.

10. The computer-readable program product of claim 9 wherein the define API allows a priority, a rule number, a rule type, at least one corresponding field and at least one corresponding patterns to be defined.

11. The computer-readable program product of claim 8 wherein the plurality of generic APIs include a purge API to allow a portion of the plurality of rules for a network processor of the plurality of heterogeneous network processors to be deleted.

12. The computer-readable program product of claim 8 wherein the plurality of generic APIs include a delete API for allowing a rule of the plurality of rules to be deleted.

13. The computer-readable program product of claim 8 wherein the plurality of generic APIs include a list API for allowing a portion of the plurality of rules to be listed.

14. The computer-readable program product of claim 8 wherein the plurality of generic APIs include a swap API for allowing a first priority of a first rules to be swapped with a second priority of a second rule.

15. A method for controlling packet classification behavior of a plurality of heterogeneous network processors in a network using a plurality of definable rules for determining packet classification behavior in a predetermined priority sequence, the network also including at least one host processor utilizing at least one packet classification application, the method comprising:

(a) abstracting, by the host processor, the packet classification behavior of each of the plurality of heterogeneous network processors;

(b) providing, by the host processor, a plurality of generic application program interfaces (APIs) based on the abstraction devoid of a separate set of APIs which are specific to each type of one or more of the plurality of heterogeneous network processors, the plurality of generic APIs communicating with the at least one packet classification application and the plurality of heterogeneous network processors, the plurality of generic APIs for communicating with the at least one packet classification application in the at least one host processor in a network processor independent manner, the plurality of generic APIs managing the packet classification behavior of the plurality of heterogeneous network processors in a network processor specific manner by managing software or firmware associated with the plurality of the heterogeneous network processors, and the plurality of generic APIs further providing a null behavior as a packet classification behavior for unsupported operations and including a define API for allowing a rules of the plurality of definable rules to be defined by abstraction;

wherein the plurality of generic APIs allow the at least one packet classification application to be network processor independent and to manage the packet classification behavior of the plurality of heterogeneous network processors in the network processor specific manner.

16. The method of claim 15 wherein the plurality of generic APIs further return a null behavior for a portion of the plurality of heterogeneous network processors in which a particular function of a particular API is not supported by one or more of the plurality of heterogeneous network processors.

17. The method of claim 15, wherein the define API allows a priority, a rule number, a rule type, at least one corresponding field and at least one corresponding patterns to be defined.

18. The method of claim 15 wherein the plurality of generic APIs include a purge API to allow a portion of the plurality of definable rules for a network processor of the plurality of heterogeneous network processors to be deleted.

19. The method of claim 15 wherein the plurality of generic APIs include a delete API for allowing a rule of the plurality of definable rules to be deleted.

20. The method of claim 15 wherein the plurality of generic APIs include a list API for allowing a portion of the plurality of definable rules to be listed.

21. The method of claim 15 wherein the plurality of generic APIs include a swap API for allowing a first priority of a first rule to be swapped with a second priority of a second rule.

* * * * *